United States Patent
Thayyullathil (10) Patent No.: US 11,796,241 B2
(45) Date of Patent: Oct. 24, 2023

(54) METHOD AND APPARATUS FOR CONTROLLING HUMIDITY WITHIN A COMPARTMENT OF REFRIGERATION APPLIANCE

(71) Applicant: Viking Range, LLC, Greenwood, MS (US)

(72) Inventor: Jemsheer Thayyullathil, Greenwood, MS (US)

(73) Assignee: Viking Range, LLC, Greenwood, MS (US)

( * ) Notice: Subject to any disclaimer, the term of this patent is extended or adjusted under 35 U.S.C. 154(b) by 318 days.

(21) Appl. No.: 17/070,659

(22) Filed: Oct. 14, 2020

(65) Prior Publication Data
US 2022/0113077 A1    Apr. 14, 2022

(51) Int. Cl.
   *F25D 11/02*   (2006.01)
   *F25D 17/04*   (2006.01)
   *F24F 3/14*    (2006.01)

(52) U.S. Cl.
   CPC .............. *F25D 17/042* (2013.01); *F24F 3/14* (2013.01); *F25D 11/02* (2013.01); *F25D 2600/02* (2013.01); *F25D 2700/00* (2013.01); *F25D 2700/12* (2013.01)

(58) Field of Classification Search
   CPC ............ F25B 2600/01; F25B 2600/111; F25B 2600/112; F25D 2317/04131; F25D 2317/0682; F25D 2600/02; F25D 2700/00; F25D 2700/12
   See application file for complete search history.

(56) References Cited

U.S. PATENT DOCUMENTS

| | | | |
|---|---|---|---|
| 5,303,561 A | 4/1994 | Bahel et al. | |
| 5,377,498 A * | 1/1995 | Cur | F25B 41/385 62/197 |
| 6,672,086 B2 | 1/2004 | Zangari et al. | |
| 7,895,851 B2 | 3/2011 | Bianchi et al. | |
| 8,161,761 B2 | 4/2012 | Shao | |
| 8,826,679 B2 | 9/2014 | May et al. | |
| 9,417,005 B1 | 8/2016 | Roth et al. | |
| 2009/0090117 A1* | 4/2009 | McSweeney | F25B 49/022 62/204 |

(Continued)

FOREIGN PATENT DOCUMENTS

| | | |
|---|---|---|
| EP | 0050333 B1 | 7/1986 |
| JP | 2015052429 A | 3/2015 |
| WO | WO2015118277 | 8/2015 |

OTHER PUBLICATIONS

Duparc et al. 2015, eSpacenet, all Machine translation of description of WO2015188277 (Year: 2015).*

*Primary Examiner* — Filip Zec
(74) *Attorney, Agent, or Firm* — Crowell & Moring LLP (57) ABSTRACT

A controller within a refrigeration application controls temperature and humidity within a compartment of the refrigeration application. The controller may begin cooling the compartment based on a measured temperature value for the compartment. The controller may delay a starting time of an evaporator fan within the compartment based at least in part on a measured humidity value for the compartment. The controller may also adjust an operating time of a condenser fan based at least in part on the measured humidity value.

19 Claims, 4 Drawing Sheets

(56) References Cited

U.S. PATENT DOCUMENTS

| | | | |
|---|---|---|---|
| 2013/0340457 A1* | 12/2013 | Keres | F04B 51/00 |
| | | | 62/129 |
| 2015/0107280 A1 | 4/2015 | Vijayan et al. | |
| 2015/0158369 A1* | 6/2015 | Greiner | F25B 49/02 |
| | | | 62/89 |
| 2015/0211778 A1* | 7/2015 | Buendia Garcia | F25B 49/02 |
| | | | 62/89 |
| 2017/0074566 A1* | 3/2017 | Keres | F25B 49/005 |
| 2017/0219280 A1* | 8/2017 | Suh | G05F 3/02 |
| 2017/0261251 A1 | 9/2017 | Cho et al. | |

* cited by examiner

METHOD AND APPARATUS FOR CONTROLLING HUMIDITY WITHIN A COMPARTMENT OF REFRIGERATION APPLIANCE

TECHNICAL FIELD

This disclosure relates to methods and apparatuses for controlling humidity within a compartment of a refrigeration appliance.

BACKGROUND

A refrigeration thermodynamic cycle operates to keep a compartment within a refrigeration appliance at a cool temperature. The refrigeration cycle uses a cycle of compression, condensation, expansion, and evaporation in a closed circuit. A refrigerant is used to cool the compartment in the refrigeration appliance. The refrigerant is compressed by the compressor and is cooled by a condenser and condenser fan (which allow heat to escape into the ambient environment), where the refrigeration is converted from a vapor to a liquid. The liquid refrigerant is then moved toward an expansion valve where the pressure is significantly reduced. By reducing the pressure, the temperature of the refrigerant dramatically decreases. This cool refrigerant then moves through the evaporator coil within the compartment. An evaporator fan blows the air within the compartment across the cold evaporator coils and the temperature of the compartment is reduced. The refrigerant within the evaporator coil absorbs heat from the compartment air and is converted back into a vapor, and the warmed refrigerant is moved back to the compressor to be recompressed, and the cycle repeats itself.

SUMMARY

In various embodiments, a controller controls temperature and humidity within a compartment of a refrigeration application. The controller may be configured to determine that a measured temperature value within the first compartment exceeds a preset cut-in threshold temperature value, activate the compressor to decrease a coil temperature of the evaporator in response to determining that the measured temperature value within the first compartment exceeds the cut-in threshold temperature value, and determine a measured humidity value within the first compartment. Then, the controller may delay a start of an evaporator fan within the first compartment after the compressor turns on based at least in part on a measured humidity value for the first compartment. The controller may also adjust an operating speed of a condenser fan based at least in part on the measure humidity value. Further, the controller may delay a stop of the evaporator fan after the compressor turns off. The controller may also adjust an operating speed of the condenser fan based at least in part on the measure humidity value. In this manner, a refrigeration appliance is improved with the addition of features not previously available. For example, by delaying the start of the evaporator fan after the compressor turns on, a layer of frost and/or ice is intentionally formed on the evaporator coils, thereby reducing the cooling efficiency of the refrigeration system. In so doing, the refrigeration system will not remove as much humidity within the compartment during a cooling cycle, thereby better maintaining a desired relative humidity within the compartment.

DETAILED DESCRIPTION

In typical refrigeration systems, in order to begin cooling the compartment, a controller turns on the compressor and turns on the evaporator fan that blows air from the compartment across the evaporator coil in order to prevent a small layer of ice or frost from forming on the evaporator coil. In this manner, the overall efficiency of the refrigeration cycle is increased. However, in many instances, this approach can cause a dramatic decrease in the relative humidity within the compartment. The low relative humidity within the compartment may have negative effects for humidity sensitive articles within the compartment. For example, such dry conditions, may cause the corks of bottles of wine in the compartment to dry prematurely, possibly failing and allowing the wine to spoil.

The current inventor has discovered, through testing and development, that altering the timing of operation of the evaporator fan within the refrigerator compartment relative to the operation of the compressor (and the flow of refrigerant within the system) can improve humidity stability within the refrigeration compartment, particularly by reducing dips in compartment humidity while the refrigeration system is operating. As discussed below, this discovered improvement in humidity stability can reduce the overall cooling efficiency of the system and thus runs contrary to the market push for increased efficiency in such refrigeration appliances. However, in various embodiments, a refrigeration system design in accordance with the disclosure below may be flexible and may be utilized in situations where humidity stability is desired in addition to instances where increased efficiency is desired. As is also discussed below, in various embodiments, a user may be able to selectively enable or disable such a humidity stability feature. As such, a single refrigeration appliance may be configured to operate in either mode (e.g., humidity stability or optimal efficiency).

Figure 1:
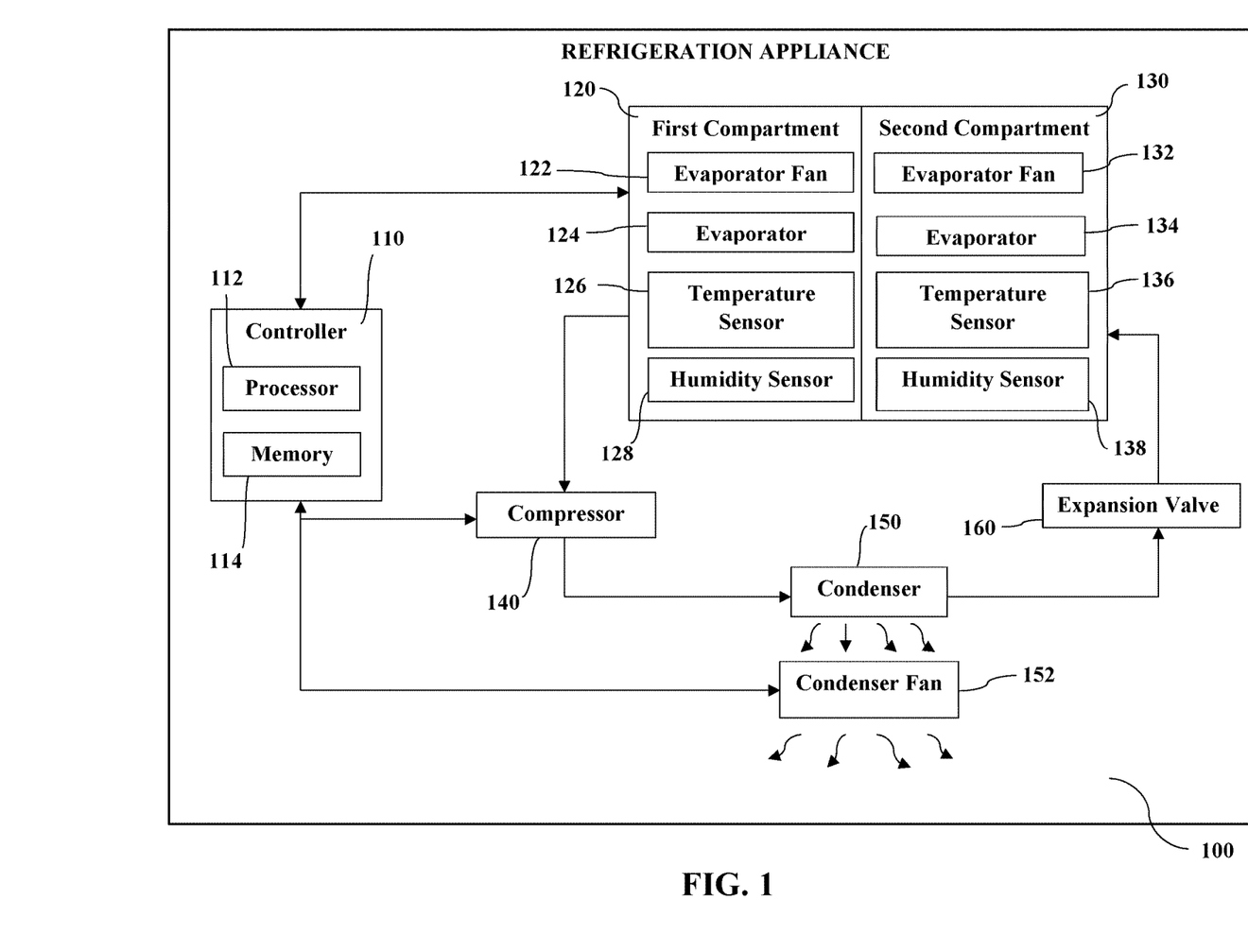
FIG. 1 shows and example schematic of a refrigeration appliance in accordance with various embodiments.

Turning now to the figures, FIG. 1 shows an example refrigeration appliance 100 according to various embodiments. The refrigeration appliance 100 may be a commercial or residential refrigerator, a freezer, a chiller, a beverage fridge, a wine cooler, or any other type of refrigeration appliance 100. The refrigeration appliance 100 includes an interior compartment configured to store food items or other items. In some embodiments, the refrigeration appliance 100 may include one or more compartments, such as a first compartment 120 and, optionally, a second compartment 130. Additional compartments may also be included in various embodiments. The refrigeration appliance 100 also may include one or more doors configured to allow access to the compartment of the refrigeration appliance 100.

The refrigeration appliance 100 may include a controller 110 configured to control temperature and humidity within one or more compartments of the refrigeration appliance 100. The controller 110 may be coupled to compressor 140, an evaporator 124 and/or evaporator fan 122 within the first compartment 120, an evaporator 134 and/or evaporator fan 132 within the second compartment 130, a condenser 150, and/or a condenser fan 152. Through connection with these various elements, the controller 110 can control temperature and humidity within the first compartment 120 and the optional second compartment 130. In some embodiments, the controller 110 may control some or all operations of the refrigeration appliance 100. For example, the controller 110 may control all the refrigeration cycle (e.g., cooling each of the compartments, and/or switching for the cooling between the first compartment and the second compartment), but may also control other aspects, such as lighting, user interfaces, communications, or power monitoring, to name a few.

In various embodiments, the controller 110 may include one or more processors 112 and one or more memories 114. In some embodiments, the controller 110 may include the one or more processors 112, such as one or more Central Processing Units (CPUs), microcontrollers, or microprocessors that operate together to control the functions and operations of the refrigeration appliance 100. Similarly, the controller 110 may include or be implemented with an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The controller 110 may include discrete interconnected hardware components or may be combined on a single integrated circuit die, distributed among multiple integrated circuit dies, or implemented in a Multiple Chip Module (MCM) of multiple integrated circuit dies in a common package, as examples.

The controller 110 may also include one or more memories 114 or other tangible storage mediums other than a transitory signal, and may comprise a flash memory, a Random Access Memory (RAM), a Read Only Memory (ROM), an Erasable Programmable Read Only Memory (EPROM), a Hard Disk Drive (HDD), or other magnetic or optical disk; or another machine-readable nonvolatile medium. The memory 114 may store therein software modules and instructions that, when executed by the processor 112, cause the processor 112 to implement any of the methods described herein or illustrated in the drawings. In some embodiments, the memory 114 may also store a preset temperature target, a preset cut-in threshold temperature value, a preset cut-out threshold temperature value, and/or a preset relative humidity value of the first compartment 120 and/or of the second compartment 130. All or some of these values may be selectable or editable by a user using a user interface of the refrigeration appliance 100, or may be preset at the time of design or manufacturing. In some embodiments, the cut-in threshold temperature value and/or the cut-out threshold temperature value are calculated based on the preset temperature target. In a non-limiting example, the cut-in threshold temperature value may be 5 degrees above the temperature target, and the cut-out threshold temperature value may be 5 degrees below the temperature target.

In various embodiments, the first compartment 120 may include an evaporator fan 122, an evaporator 124, a temperature sensor 126, and, optionally, a humidity sensor 128. The optional second compartment 130 may similarly include an evaporator fan 132, an evaporator 134, a temperature sensor 136, and, optionally, a humidity sensor 138. In various approaches, the first compartment 120 and the second compartment 130 may both be coupled to the same refrigeration components exterior to each compartment cycle (e.g., the compressor 140, condenser 150, and expansion valve 160), and may share those components at different times, for example, by being selectively connected to those exterior components by one or more valves or other components. The refrigerant becomes thermally coupled to the increased surface area of the evaporator 124, 134. The evaporator fan 122, 132 blows air form the compartment over the evaporator 124, 134, which aids heat transfers from the compartment air to the refrigerant within the evaporator 124, 134. Thereby, a temperature in the first compartment 120 and/or the second compartment 130 drops as the refrigerant absorbs the heat from the compartment air. For example, when a temperature of the evaporator 124 is around 40° F. and a measured temperature of the first compartment 120 is 45° F., the temperature in the first compartment 120 drops as the evaporator fan 122 or 132 blows the compartment air across the evaporator 124 or 134.

The warmed (and vaporized) refrigerant exits the refrigeration compartment 120 or 130 returns to the compressor 140 where it is compressed to a high pressure and a temperature. Then, the vaporized refrigerant at the high pressure and temperature enters the condenser 150. The condenser fan 152 blows air (exterior to the compartment 120 or 130) through one or more coils of the condenser 150. This air absorbs heat from the warm refrigerant within the condenser 150 in order to cool the refrigerant within the condenser 150. This absorbed heat is then released into the air of the surrounding environment. In addition to getting colder, the refrigerant may change phase from a vapor back to a liquid at the high pressure. The liquid refrigerant passes through the expansion valve 160. When the liquid refrigerant does get through the expansion valve 160, a temperature of the liquid refrigerant drops as the pressure lowers. The liquid refrigerant at a low temperature and low pressure is cycled back to the evaporator 124.

In various embodiments, the controller 110 may be configured to select one of the first compartment 120 and the second compartment 130 as an active compartment to begin cooling based on a first delta-to-cut in temperature for the first compartment 120 and a second delta-to-cut in temperature for the second compartment 130. The first delta-to-cut in temperature may be calculated as a difference between a measured temperature and a preset cut-in threshold temperature value for the first compartment 120. The second delta-to-cut-in temperature may be calculated as a difference between a measure temperature and a preset cut-in threshold temperature value for the second compartment 130. The memory 114 may store and update each of the preset cut-in threshold temperature value for the first compartment 120 and second compartment 130. In certain approaches, the controller 110 may select the first compartment 120 as an active compartment to begin cooling if the first delta-to-cut-in temperature is greater than the second delta-to-cut-in temperature. However, there may be other factors that drive the determination of which compartment (e.g., as between the first or second compartment, or another compartment) to begin cooling.

In various embodiments, the controller 110 may determine that a measured temperature value within the first compartment 120 exceeds a preset cut-in threshold temperature value. The controller 110 may then activate the compressor 140 to decrease a coil temperature of the evaporator 124 within the selected first compartment 120. The humidity sensor 128 in the first compartment 120 may continuously or periodically measure the humidity value within the first compartment 120, and the controller 110 may determine a measured humidity value within the first compartment 120 based on the reading of the humidity sensor 128. In various embodiments, the controller 110 may delay a starting time of the evaporator fan 122 after starting the compressor 140 by a evaporator fan starting delay time relative to the starting time of the compressor 140 if the measured humidity value is equal or less than a preset relative humidity (RH) value for example, 40%, 50%, 60%, or another preset RH value). The evaporator fan starting delay time relative to a starting time of the compressor 140 may vary based at least in part on the measured humidity value (e.g., as measured by humidity sensor 128) within the first compartment 120. For example, the evaporator fan starting delay time may be extended if the measured humidity is low while the evaporator fan starting delay time may be shortened (or becomes zero) if the measured humidity value is above, at or close to the preset relative humidity value. In some embodiments, the controller 110 may adjust an operation speed of the condenser fan 152 and/or the evaporator fan 122 or 132 based at least in part on the measured humidity value. In one example, the controller 110 may operate the condenser fan 152 at a first speed during the evaporator fan starting delay time, and then, the controller 110 may operate the condenser fan 152 at a second speed after the evaporator fan starting delay time. For example, the first speed may be lower than the second speed.

In some embodiments, the controller 110 may be configured to determine that the measured temperature value, as measured by the temperature sensor 126 (or temperature sensors 136) within the first compartment 120 (or the second compartment 130) reaches or goes below a preset cut-out threshold temperature value. The controller 110 may, at a first time, deactivate and/or decouple the compressor 140 from the evaporator 124 (or evaporator 134) when the measured temperature value is equal or less than a preset cut-out temperature value. In certain approaches, the controller 110 may delay a stopping time of the evaporator fan 122 (or evaporator fan 132) by an evaporator fan stopping time relative to the first time (e.g., when the compressor 140 is stopped or decoupled) based at least in part on the measured humidity value as measured by the humidity sensor 128 (or humidity sensor 138). For example, the controller 110 may extend the operation of the evaporator fan 122 (or evaporation fan 132) by an evaporator fan stopping time after the controller 110 deactivates and/or decouples the compressor 140 from the evaporator 124 (or evaporator 134) within the first compartment 120 (or second compartment 130). The evaporator fan stopping time relative to a stopping time of the compressor 140 may vary based at least in part on the measured humidity value within the first compartment 120. For example, the evaporator fan stopping time may be extended if the measured humidity is low while the evaporator fan stopping time may be shortened if the measured humidity value is above, at, or close to the preset relative humidity value.

Figure 2:
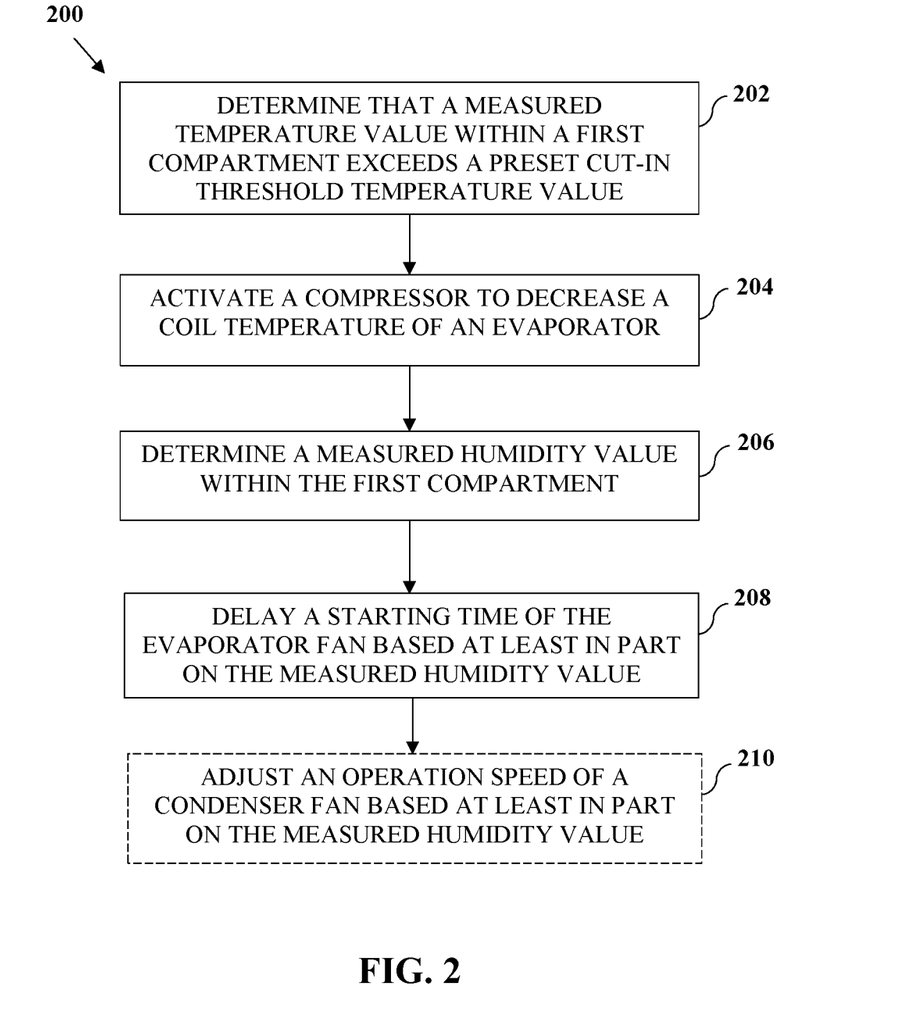
FIG. 2 shows an example flow diagram corresponding to a method for controlling humidity within a compartment of a refrigeration appliance in accordance with various embodiments.

FIG. 2 shows an example flow diagram corresponding to a method 200 for controlling temperature and humidity within a compartment 120 or 130 of the refrigeration appliance 100. In various embodiments, at 202, the method may include the controller 110 determining that a measured temperature value within the first compartment 120 exceeds a preset cut-in threshold temperature value. The temperature sensor 126 in the first compartment 120 may continuously or periodically measure the temperature value within the first compartment 120. The preset cut-in threshold temperature value may be a temperature against which the controller 110 compares the measured temperature value from the temperature sensor 126 within the compartment 120. The memory 114 may store the preset cut-in threshold temperate value for the first compartment 120. In some embodiments, the memory 114 may store a different preset cut-in threshold temperature value for each of a plurality of compartments. For example, the preset cut-in threshold temperature value for the first compartment 120 may be set at a first value (e.g., 65° F., 50° F., 40° F., or any other suitable temperature), and the preset cut-in threshold temperature value for the second compartment 130 may be set at a same or different second value.

In various examples, at 204, the method may include the controller 110 activating the compressor 140 to decrease a coil temperature of the evaporator 124 in response to determining that the measured temperature value within the first compartment 120 exceeds the cut-in threshold temperature value. The controller 110 may begin cooling the first compartment 120 by turning on the compressor 140 when the measured temperature value within the compartment 120 exceeds the cut-in threshold temperature value. In various examples, at 206, the method may include the controller 110 determining a measured humidity value within the first compartment 120. The humidity sensor 128 in the first compartment 120 may continuously or periodically measure the humidity value within the first compartment 120, and the controller 110 may retrieve or receive such measurements from the humidity sensors 128. The memory 114 may store the measured the humidity value in the first compartment 120.

In various examples, at 208, the method may include the controller 110 delaying a starting time of the evaporator fan 122 by an evaporator fan starting delay time relative to a starting time of the compressor 140 based at least in part on the measured humidity value. The controller 110 may delay the start of the evaporator fan 122 by the evaporator fan starting delay time after the compressor 140 turns on. For example, if the measured humidity value in the first compartment 120 is lower than the preset relative humidity value, the evaporator fan starting delay time may be extended for a time, for example, by 240 seconds (or any other delay time). In certain examples, the evaporator fan starting delay time has a range from 0.1 to about 240 seconds. If the measured humidity value in the first compartment 120 is within a preset relative humidity range (e.g., between 70% and 90%), the evaporator fan starting delay time may be shortened. By delaying the start of the evaporator fan 122, the controller 110 intentionally allows a layer of frost and/or ice to quickly form on the evaporator 124 (e.g., on one or more coils of the evaporator 124) from the air immediately surrounding the evaporator 124 after turning on the compressor 140. As a result of the intentional quick formation of the frost and/or ice layer caused by the delay in starting the evaporator fan 122, the cooling efficiency of the evaporator 124 and the refrigeration appliance 100 in general, is reduced and the evaporator 124 will subsequently remove less humidity from the first compartment 120.

In some embodiments, the controller 110 may determine the evaporator fan starting delay time by using a lookup table relating a plurality of evaporator fan starting delay times to a plurality of measured humidity values. The lookup table may be a table that contains measured humidity values and evaporator fan starting delay times corresponding to each of the measured humidity values. For example, if the measured humidity value in the first compartment 120 is 30% RH value, the evaporator fan starting delay time may be 120 seconds while if the measured humidity value is 45% RH value, the evaporator fan starting delay time may be 60 seconds. The memory 114 may store and update the lookup table and/or the preset relative humidity values for the first and second compartments 120, 130. Many other values are possible for the lookup table, and may be determined specifically for a given refrigeration appliance 100 to determine the ideal evaporator fan starting delay times for each humidity level. Further, in other embodiments, the lookup table may be based on other factors instead of or in addition to the measured humidity level, such as a difference between a measured humidity value and a set or target humidity level, a cut-in or cut-out temperature, a set target temperature, a delta-to-cut-in temperature, a determined geographic region or geographic elevation, an ambient temperature, an ambient humidity, or other values or settings.

In another embodiment, the controller 110 may perform a calculation according to one or more equations in order to determine an evaporator fan starting delay time based on one or more values, such as the measured humidity level (and/or any of the other values discussed above, such as a difference between a measured humidity value and a set or target humidity level, a cut-in or cut-out temperature, a set target temperature, a delta-to-cut-in temperature, a determined geographic region or geographic elevation, an ambient temperature, an ambient humidity, or other values). This equation can be determined and programmed into the controller 110 for a given refrigeration appliance 100 based on testing and development activities.

In some embodiments, a refrigeration appliance 100 may support various modes for controlling temperature and/or humidity in the first compartment 120 and/or the second compartment 130 (perhaps independent of each other), and a user may be able to select or program these options for the first compartment 120 and/or the second compartment 130, e.g., via a user interface. The controller 110 may determine that a humidity monitoring mode that activates controlling of the humidity in the first compartment 120 (or the second compartment 130) is activated. When one of the modes for activating the humidity monitoring mode is identified, the controller 110 may enable delaying the starting time of the evaporator fan 122 after the compressor 140 turns on, as discussed above. Alternatively, if the humidity monitoring mode is deactivated, the controller 110 may operate according to a different mode, for example, by starting the evaporator fan 122 around the same time as starting the compressor 140 without a delay as discussed above.

In an optional embodiment, at 210, the method may include the controller 110 adjusting an operation speed of a condenser fan 152 based at least in part on the measured humidity value. For example, the controller 110 may operate a condenser fan 152 of the refrigeration appliance 100 at a first speed during the evaporator fan starting delay time. Then, the controller 110 may operate the condenser fan 152 at a second speed after the evaporator fan starting delay time. In some embodiments, the first speed is lower than the second speed. Other variations are possible.

Figure 3:
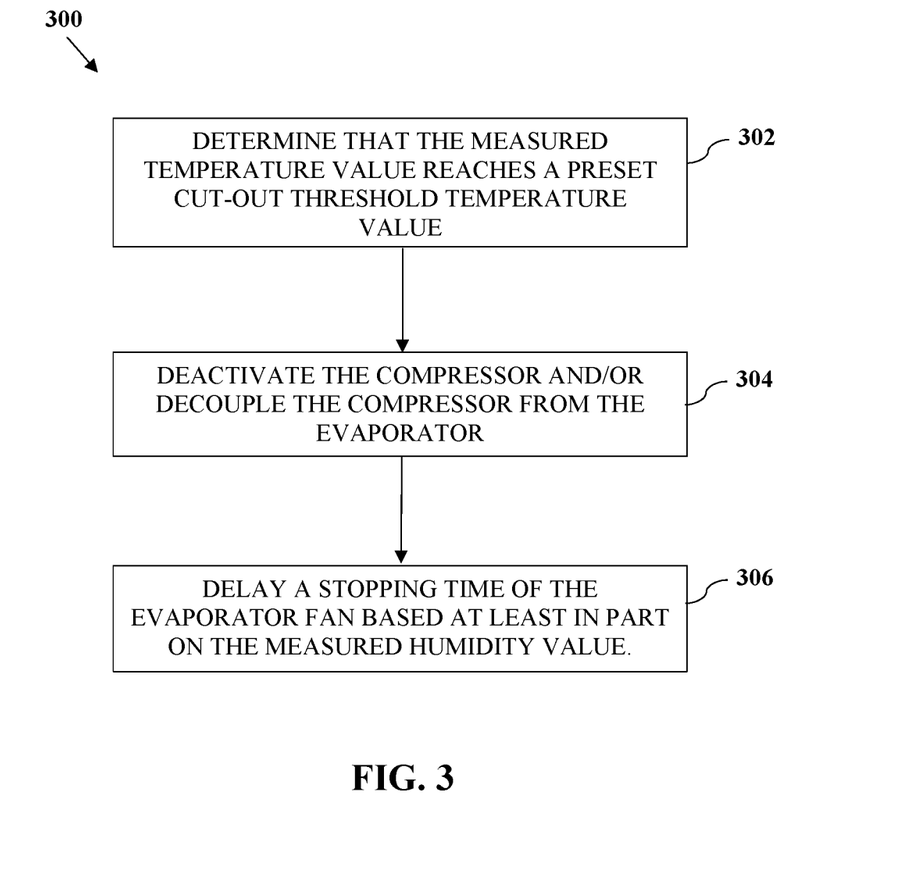
FIG. 3 shows another example flow diagram corresponding to a method for controlling humidity within a compartment of a refrigeration appliance in accordance with various embodiments.

FIG. 3 shows another example flow diagram corresponding to a method 300 for controlling humidity within a compartment of a refrigeration appliance 100. In various examples, the method 300 may be performed in addition to some or all of the steps discussed with respect to FIG. 2. In various examples, at 302, the method may include the controller 110 determining that the measured temperature value reaches a preset cut-out threshold temperature value set for a particular compartment. The temperature sensor 126 (or temperature sensor 136) in the first compartment 120 (or the second compartment 130) may continuously or periodically measure the temperature value within the first compartment 120 (or the second compartment 130). The preset cut-out threshold temperature value may be a temperature against which the controller 110 compares the measured temperature value within the first compartment 120 (or within the second compartment 130). The preset cut-in threshold temperature value is likely a higher value than the preset cut-out threshold temperature value. The controller 110 may be configured to maintain a desired temperature value range in the first compartment 120 (or the second compartment 130) between the preset cut-in threshold temperature value and the preset cut-out threshold temperature value for each respective compartment. The memory 114 may set and update the cut-out threshold temperature value for the first compartment 120 and for the optional second compartment 130 (and/or for other additional compartments). In some embodiments, the memory 114 may store a different preset cut-out threshold temperature value for each of a plurality of compartments. For example, the preset cut-out threshold temperature value for the first compartment 120 may be set at 60° F. (e.g., to store red wine) while the preset cut-out threshold temperature value for the second compartment 130 may be set at 50° F. (e.g., to store white wine), though many other temperature settings and combinations of temperatures may be utilized.

In various examples, at 304, the method may include the controller 110, at a first time, at least one of deactivating the compressor 140 or decoupling the compressor 140 from the evaporator 124 (or the evaporator 134) (e.g., using a valve) in response to determining that the measured temperature value within the first compartment 120 (or the second compartment 130) reaches the preset cut-out threshold temperature value. For example, the controller 110 may deactivate the compressor 140 and/or or decouple the compressor 140 from the evaporator 124 within the first compartment 120 if the measured temperature value within the first compartment 120 is equal to or less than the preset cut-out threshold temperature value.

In various examples, at 306, the method may include the controller 110 delaying a stopping time of the evaporator fan 122 by an evaporator fan stopping time relative to the first time (i.e., the time at which the controller 110 deactivates or decouples the compressor 140) based at least in part on the measured humidity value. The controller 110 may delay the stopping of the evaporator fan 122 after the compressor 140 turns off. The controller 110 may extend the operation of the evaporator fan 122 (or evaporator fan 132) by the evaporator fan stopping time after the controller 110 deactivates and/or decouples the compressor 140 from the evaporator 124 within the first compartment 120 (or decouples the compressor 140 from the evaporator 134 within the second compartment 130). Such delayed operation of the evaporator fan allows a liquid (e.g., water) from the ice or frost that forms on the evaporator 124 (or evaporator 134) to be recirculated into the first compartment 120 (or the second compartment 130) as the ice or frost melts, rather than being drained away, when the compressor 140 turns off and the evaporator 124 (or evaporator 134) warms up. In some embodiments, if the measured humidity value in the first compartment 120 is less than a preset relative humidity value (e.g., 40%, 45%, or 50%), the evaporator fan stopping time may be extended, for example, up to around 240 seconds. If the measured humidity value in the first compartment 120 is within a preset relative humidity range (e.g., from 70% to 90%), the evaporator fan stopping time may be shortened. For example, if the measured humidity value in the first compartment 120 is 30% value, the evaporator fan stopping time may be 120 seconds while if the measured humidity value is 45% RH value, the evaporator fan stopping time may be 60 seconds. The memory 114 may store the preset relative humidity value in each of the compartments 120, 130.

Like the evaporator fan starting delay time, discussed above, the controller 110 may determine the evaporator fan stopping time by using a lookup table relating a plurality of evaporator fan stopping times to a plurality of measured humidity values. The lookup table may be a table that contains measured humidity values and the evaporator fan stopping times corresponding to each of the measured humidity values. The memory 114 may store and update the lookup table. Many other values are possible for the lookup table, and may be determined specifically for a given refrigeration appliance 100 to determine the ideal evaporator fan stopping times for each humidity level. Further, in other embodiments, the lookup table may be based on other factors instead of or in addition to the measured humidity level, such as a difference between a measured humidity value and a set or target humidity level, a cut-in or cut-out temperature, a set target temperature, a delta-to-cut-in temperature, a determined geographic region or geographic elevation, an ambient temperature, an ambient humidity, or other values or settings.

Also like the evaporator fan starting delay time, in another embodiment, the controller 110 may perform a calculation according to one or more equations in order to determine an evaporator fan stopping time based on one or more values, such as the measured humidity level (and/or any of the other values discussed above, such as a difference between a measured humidity value and a set or target humidity level, a cut-in or cut-out temperature, a set target temperature, a delta-to-cut-in temperature, a determined geographic region or geographic elevation, an ambient temperature, an ambient humidity, or other values). This equation can be determined and programmed into the controller 110 for a given refrigeration appliance 100 based on testing and development activities.

In some embodiments, the controller 110 may begin to cool the second compartment 130 of the refrigeration appliance 100 using the compressor 140 while the evaporator fan 122 of the first compartment 120 continues to operate during the evaporator fan stopping time. For example, the controller 110 may begin the process to cool the second compartment 130 by using the compressor 140, e.g., by coupling the compressor 140 to the evaporator 134 in the second compartment 130, while the evaporator fan 122 in the first compartment 120 may continue to blow air from the first compartment 120 across the evaporator 124. In various examples, the described methods for maintaining temperature and humidity within the first compartment 120 may also apply to a cooling cycle for the second compartment 130.

In some embodiments, the controller 110 may prevent reactivation of the compressor 140 for a compressor dwell time duration after deactivating the compressor 140. For example, during the compressor dwell time, the compressor 140, and optionally the condenser fan 152, turns off. After the compressor dwell time, the controller 110 may select one of the first compartment 120 and the second compartment 130 as an active compartment to begin cooling based on a first delta-to-cut-in temperature for the first compartment 120 and a second delta-to-cut-in temperature for the second compartment 130. This compressor dwell time allows the compressor 140 to rest and/or cool down, thereby extending the expected life of the compressor 140.

Figure 4:
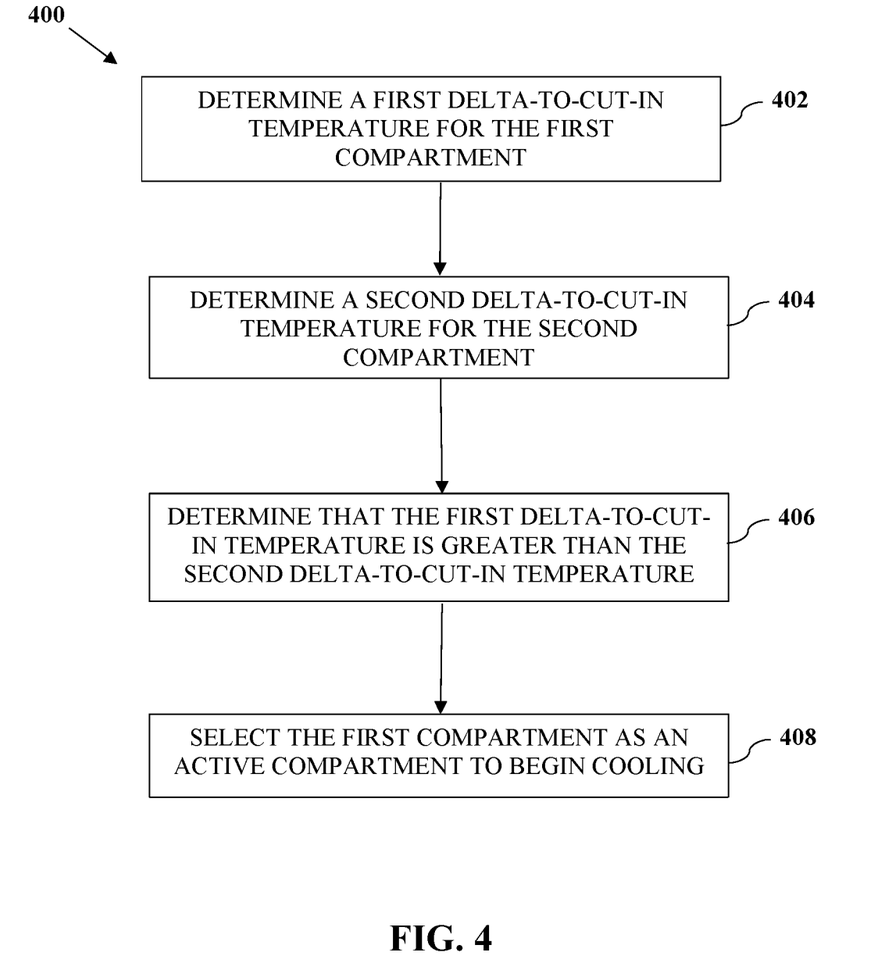
FIG. 4 shows another example flow diagram corresponding to a method for controlling humidity within a compartment of a refrigeration appliance in accordance with various embodiments.

FIG. 4 shows another example flow diagram corresponding to a method 400 for controlling temperature and humidity within a compartment of a refrigeration appliance 100. In various examples, the method 300 may be performed in addition to (e.g., prior to) some or all of the steps discussed with respect to FIG. 2. In various examples, at 402, the controller 110 may determine a first delta-to-cut-in temperature for the first compartment 120 comprising a difference between the measured temperature of the first compartment 120 and the cut-in temperature of the first compartment 120. For example, if the measured temperature of the first compartment 120 is 75° F. and the cut-in temperature of the first compartment 120 is 45° F., the controller 110 may determine that the first delta-to-cut-in temperature is 30° F.

In various examples, at 404, the method may include the controller 110 determining a second delta-to-cut-in temperature for the second compartment 130 comprising a difference between a measured temperature of the second compartment 130 and a cut-in temperature of the second compartment 130. For example, if the measured temperature of the first compartment 120 is 75° F. and the cut-in temperature of the first compartment 120 is 55° F., the controller 110 may determine that the first delta-to-cut-in temperature is 20° F.

In various examples, at 406, the method may include the controller 110 determining that the first delta-to-cut-in temperature is greater than the second delta-to-cut-in temperature. At 408, the controller 110 may select the first compartment 120 as an active compartment to begin cooling in response to determining that the first delta-to-cut-in temperature is greater than the second delta-to-cut-in temperature. The controller 110 may select one of the first compartment 120 and the second compartment 130 as an active compartment. For example, if the first delta-to-cut-in temperature is 25° F. and the second delta-to-cut-in temperature is 15° F., the controller 110 may select the first compartment 120 as an active compartment to begin cooling. However, if the first delta-to-cut-in temperature is 15° F. and the second delta-to-cut-in temperature is 25° F., the controller 110 may select the second compartment 130 as an active compartment to begin cooling.

So configured, the controller 110 decreases the efficiency of refrigeration cycle (e.g., cooling within the compartments) by allowing a small layer of ice or frost to form on the evaporator 124 or 134 before the evaporator fan 122 or 132 starts, such that the evaporator coil 124 or 134 will not remove as much humidity from the respective first compartment 120 or second compartment 130. The small layer of ice or frost formed on the evaporator 124 or 134 can reduce the dramatic decrease in the relative humidity within the compartment 120 or 130 during the cooling cycle. As such, the large humidity swings in the compartment 120 or 130 that occur with typical refrigeration appliances can be avoided and the humidity level can be maintained within a desired humidity range for the article (e.g., wine).

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. One skilled in the art will realize that a virtually unlimited number of variations to the above descriptions are possible, and that the examples and the accompanying figures are merely to illustrate one or more examples of implementations. It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, devices, or systems that would be known by one of ordinary skill have not been described in detail so as not to obscure claimed subject matter. Various implementations have been specifically described. However, many other implementations are also possible.

What is claimed is:

1. A method for controlling humidity within a first compartment of a refrigeration appliance, the refrigeration appliance comprising a compressor, an evaporator, and an evaporator fan, the method comprising:
    determining, by a controller, that a measured temperature value within the first compartment exceeds a preset cut-in threshold temperature value;
    activating, by the controller, the compressor to decrease a coil temperature of the evaporator in response to determining that the measured temperature value within the first compartment exceeds the cut-in threshold temperature value;
    determining, by the controller, a measured humidity value within the first compartment;
    delaying, by the controller, a starting time of the evaporator fan by an evaporator fan starting delay time relative to a starting time of the compressor based at least in part on the measured humidity value;
    determining, by the controller, that the measured temperature value reaches a preset cut-out threshold temperature value;
    at a first time, by the controller, at least one of deactivating the compressor or decoupling the compressor from the evaporator in response to determining that the measured temperature value within the first compartment reaches the preset cut-out threshold temperature value; and
    delaying, by the controller, a stopping time of the evaporator fan by an evaporator fan stopping time relative to the first time based at least in part on the measured humidity value.

2. The method of claim 1, wherein delaying the starting time of the evaporator fan further comprises forming a layer of frost on the evaporator.

3. The method of claim 1, wherein delaying the starting time of the evaporator fan decreases a cooling efficiency of the refrigeration appliance within the first compartment.

4. The method of claim 1, further comprising:
    beginning, by the controller, to cool a second compartment of the refrigeration appliance using the compressor while the evaporator fan of the first compartment continues to operate during the evaporator fan stopping time.

5. The method of claim 1, wherein the refrigeration appliance further comprises a second compartment, wherein the method further comprises:
    determining, by the controller, a first delta-to-cut-in temperature for the first compartment comprising a difference between the measured temperature of the first compartment and the cut-in temperature of the first compartment;
    determining, by the controller, a second delta-to-cut-in temperature for the second compartment comprising a difference between a measured temperature of the second compartment and a cut-in temperature of the second compartment;
    determining, by the controller, that the first delta-to-cut-in temperature is greater than the second delta-to-cut-in temperature; and
    selecting, by the controller, the first compartment as an active compartment to begin cooling in response to determining that the first delta-to-cut-in temperature is greater than the second delta-to-cut-in temperature.

6. The method of claim 1, wherein the evaporator fan starting delay time has a range from 0.1 to about 240 seconds.

7. The method of claim 1, wherein determining that the measured humidity value within the first compartment comprises:
    determining, by the controller, that a humidity monitoring mode that activates controlling of the humidity in the first compartment is activated; and
    enabling delaying, by the controller, the starting time of the evaporator fan in response to determining that the humidity monitoring mode is activated.

8. The method of claim 1, further comprising:
    determining, by the controller, that the measured temperature value reaches a preset cut-out threshold temperature value;
    deactivating, by the controller, the compressor in response to determining that the measured temperature value within the first compartment reaches the cut-out threshold temperature value; and
    preventing, by the controller, reactivation of the compressor for a compressor dwell time duration after deactivating the compressor.

9. The method of claim 1, further comprising:
    operating, by the controller, a condenser fan of the refrigeration appliance at a first speed during the evaporator fan starting delay time; and
    operating, by the controller, the condenser fan at a second speed after the evaporator fan starting delay time,
    wherein the first speed is lower than the second speed.

10. The method of claim 1, wherein the controller determines the evaporator fan starting delay time starting time by using a lookup table relating a plurality of evaporator fan starting delay times to a plurality of measured humidity values.

11. A controller for controlling temperature and humidity within a first compartment of a refrigeration appliance, the controller configured to:
    determine that a measured temperature value within the first compartment exceeds a preset cut-in threshold temperature value;
    activate a compressor to decrease a coil temperature of an evaporator in the first compartment in response to determining that the measured temperature value within the first compartment exceeds the cut-in threshold temperature value;

determine a measured humidity value within the first compartment;

delay a starting time of an evaporator fan by an evaporator fan starting delay time relative to a starting time of the compressor based at least in part on the measured humidity value;

determine that the measured temperature value reaches a preset cut-out threshold temperature value;

at a first time, at least one of deactivate the compressor or decouple the compressor from the evaporator in response to determining that the measured temperature value within the first compartment reaches the preset cut-out threshold temperature value; and delay a stopping time of the evaporator fan by an evaporator fan stopping time relative to the first time based at least in part on the measured humidity value.

12. The controller of claim 11, wherein the controller is further configured to allow a layer of frost to form on the evaporator.

13. The controller of claim 11, wherein the controller decreases a cooling efficiency of the refrigeration appliance within the first compartment.

14. The controller of claim 11, wherein the controller is further configured to begin to cool a second compartment of the refrigeration appliance using the compressor while the evaporator fan of the first compartment continues to operate during the evaporator fan stopping time.

15. The controller of claim 11, wherein the refrigeration appliance further comprises a second compartment, wherein the controller is further configured to:
   determine a first delta-to-cut-in temperature for the first compartment comprising a difference between the measured temperature of the first compartment and the cut-in temperature of the first compartment;
   determine a second delta-to-cut-in temperature for the second compartment comprising a difference between a measured temperature of the second compartment and a cut-in temperature of the second compartment;
   determine that the first delta-to-cut-in temperature is greater than the second delta-to-cut-in temperature; and
   select the first compartment as an active compartment to begin cooling in response to determining that the first delta-to-cut-in temperature is greater than the second delta-to-cut-in temperature.

16. The controller of claim 11, wherein the evaporator fan starting delay time has a range from 0.1 to about 240 seconds.

17. The controller of claim 11, wherein the controller is further configured to:

determine, by the controller, that a humidity monitoring mode that activates controlling of the humidity in the first compartment is activated; and enable delaying, by the controller, the starting time of the evaporator fan in response to determining that the humidity monitoring mode is activated.

18. The controller of claim 11, wherein the controller is further configured to:
   operate a condenser fan of the refrigeration appliance at a first speed during the evaporator fan starting delay time; and
   operate the condenser fan at a second speed after the evaporator fan starting delay time, wherein the first speed is lower than the second speed.

19. A controller for controlling temperature and humidity within a first compartment of a refrigeration appliance, the controller configured to:
   determine that a measured temperature value within the first compartment exceeds a preset cut-in threshold temperature value;
   activate a compressor to decrease a coil temperature of an evaporator in the first compartment in response to determining that the measured temperature value within the first compartment exceeds the cut-in threshold temperature value;
   determine a measured humidity value within the first compartment; and
   delay a starting time of an evaporator fan by an evaporator fan starting delay time relative to a starting time of the compressor based at least in part on the measured humidity value,
   wherein the refrigeration appliance further comprises a second compartment, and wherein the controller is further configured to:
   determine a first delta-to-cut-in temperature for the first compartment comprising a difference between the measured temperature of the first compartment and the cut-in temperature of the first compartment;
   determine a second delta-to-cut-in temperature for the second compartment comprising a difference between a measured temperature of the second compartment and a cut-in temperature of the second compartment;
   determine that the first delta-to-cut-in temperature is greater than the second delta-to-cut-in temperature; and
   select the first compartment as an active compartment to begin cooling in response to determining that the first delta-to-cut-in temperature is greater than the second delta-to-cut-in temperature.

* * * * *